United States Patent

Turek

Patent Number: 5,001,925
Date of Patent: Mar. 26, 1991

[54] METHOD FOR ESTIMATING YARN TEMPERATURE

[75] Inventor: Douglas E. Turek, Kingston, Canada

[73] Assignee: Du Pont Canada Inc., Mississauga, Canada

[21] Appl. No.: 406,802

[22] Filed: Sep. 12, 1989

[51] Int. Cl.⁵ .................. G01L 5/04; G01K 13/04; G01K 13/06
[52] U.S. Cl. .................................. 73/160; 374/141; 374/153
[58] Field of Search ............... 374/153, 141; 73/160

[56] References Cited

U.S. PATENT DOCUMENTS

| | | | |
|---|---|---|---|
| 2,618,672 | 11/1952 | Cizmadia et al. | 374/153 |
| 3,191,437 | 6/1965 | Heard, Jr. | 374/153 |
| 3,209,589 | 10/1965 | Schlatter | 73/160 |
| 3,430,492 | 3/1969 | Matsumoto et al. | 374/153 |
| 3,534,610 | 10/1970 | Pruden | 374/153 |
| 3,785,062 | 1/1974 | Finley et al. | 34/34 |
| 4,046,990 | 9/1977 | White | 374/153 |
| 4,393,701 | 7/1983 | Lawson | 73/160 |
| 4,479,770 | 10/1984 | Slat et al. | 425/503 |
| 4,479,979 | 10/1984 | Prober | 427/9 |
| 4,566,319 | 1/1986 | Yamazaki et al. | 73/160 |

*Primary Examiner*—William A. Cuchlinski, Jr.
*Assistant Examiner*—Diego F. F. Gutierrez

[57] ABSTRACT

A method of estimating yarn temperature comprises, measuring the temperature of a guide pin in contact with the yarn; measuring the tension of the yarn with a tensiometer; and estimating yarn temperature using the correlation:

$$Tyarn = k1 + k2 \times Tpin - k3 \times (F - k4)$$

wherein Tyarn is the estimated temperature of the yarn: k1, k2, k3 and k4 are empirically determined constants; Tpin is the temperature of the guide pin; and F is yarn tension.

1 Claim, 3 Drawing Sheets

METHOD FOR ESTIMATING YARN TEMPERATURE

This invention relates to a method of estimating the temperature of yarns during processing.

The temperature of synthetic yarns during processing may reveal valuable information about the manufacturing process and about the quality of the yarn being produced.

Temperature sensors are disclosed in U.S. Pat. Nos. 3,785,062; 3,534,610; 2,618,672; 3,430,492 and 4,479,770. The latter patent discloses a temperature sensor installed on a pin.

It has been found that guide pin temperature sensors such as that disclosed in U.S. Pat. No. 4,479,770 do not always provide an accurate indication of yarn temperature.

It is desired to estimate yarn temperature more accurately.

SUMMARY OF THE INVENTION

Accordingly, the invention provides a method of estimating yarn temperature comprising:
measuring the temperature of a guide pin in contact with said yarn;
measuring the tension of the yarn with a tensiometer;
estimating yarn temperature using the correlation:

$$Tyarn = k1 + k2 \times [Tpin - k3 \times (F - k4)]$$

wherein Tyarn is the estimated temperature of the yarn;
k1, k2, k3 and k4 are empirically determined constants;
Tpin is the temperature of the guide pin; and
F is yarn tension.

It has been found that temperature sensors mounted on guide pins do not always provide an accurate measurement of yarn temperature, since part of the temperature measurement is attributable to yarn friction over the pin rather than to yarn temperature. This friction effect becomes significant in areas of the process where yarn tension is high, such as immediately before the yarn is wound onto packages.

BRIEF DESCRIPTION OF THE DRAWINGS

Preferred embodiments of the invention will be described, by way of illustration only, with reference to the following drawings in which.

DESCRIPTION OF THE PREFERRED EMBODIMENTS

Figure 1:
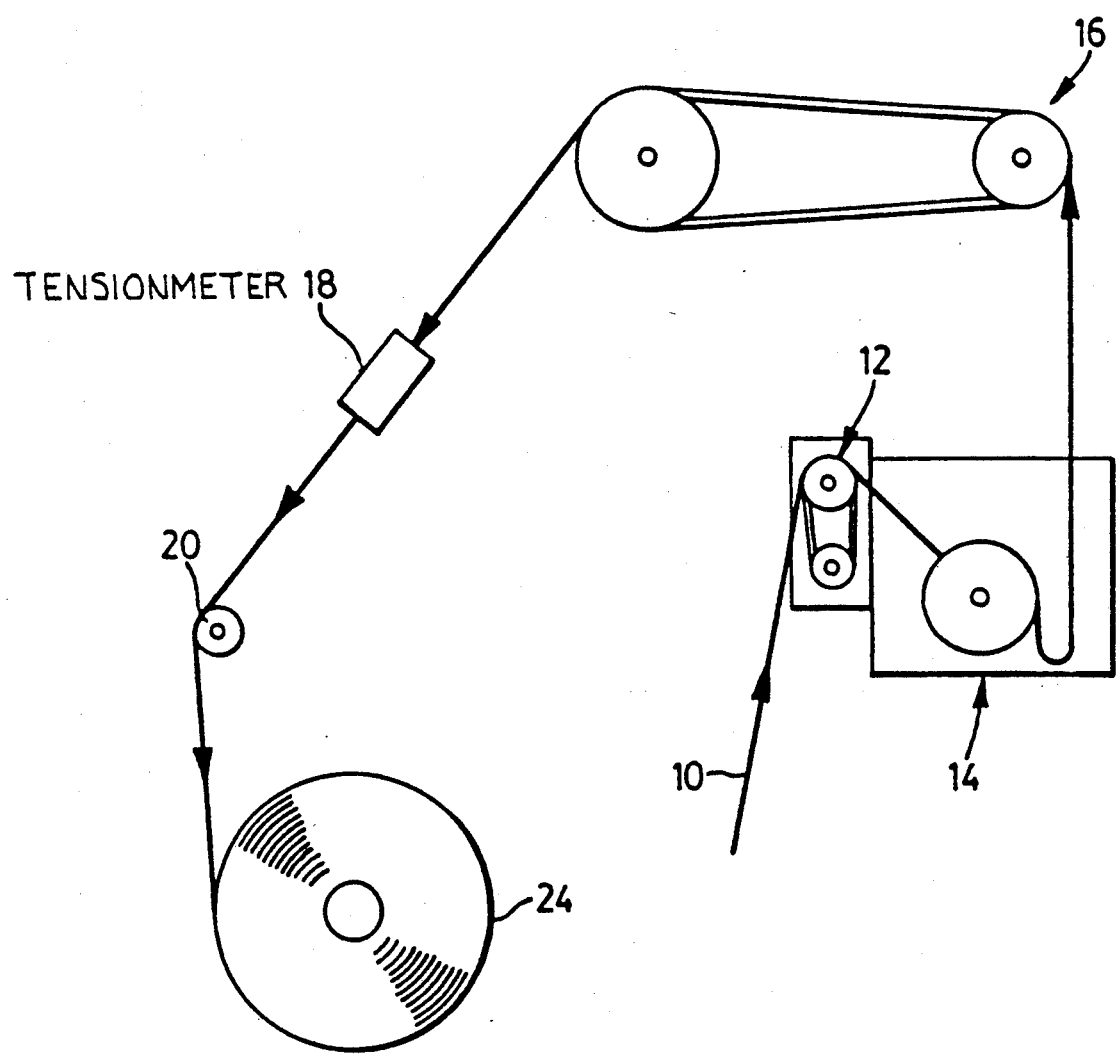
FIG. 1 is a diagrammatic illustration of a preferred embodiment of a yarn package wind-up process.

FIG. 1 shows a yarn bulking and winding process wherein the yarn 10 is processed through heat setting roller 12, a bulking chest 14 and is then taken up from the chest by take-up rollers 16. An on-line tensiometer 18 is located downstream from the take-up rollers 16. A guide pin 20 in which a temperature sensor is installed is located after the tensiometer. The yarn 10 is then wound onto a package.

The temperature sensor is a resistance temperature device located in a coaxial bore in the pin. The pin has insulation on the exterior thereof and the insulation has an opening therein to allow the yarn to contact the pin.

The constants k1, k2, k3 and k4 of Equation (1) may be determined as follows:

To determine k1 and k2, experiments may be carried out wherein yarn tension (F) is kept constant by controlling the wind-up speed and the speed of the take up rollers and yarn temperature Tyarn is varied by changing the temperature of the hot rollers 12. Yarn temperature is measured by an infrared temperature sensor and guide pin temperature is measured by the resistance temperature device installed in the guide pin 20. The infrared temperature sensor is an experimental device only, since it is too bulky and expensive to be installed on-line. Yarn tension is measured by the on-line tensiometer 18. A curve for yarn temperature versus guide pin temperature is then determined from the experimental data. The slope of the curve gives a value for k2 and the interception point along the guide pin temperature axes gives a value for k1.

The constant k4 is equal to the constant yarn tension used in the experiments to determine k1 and k2. The constant k3 is determined by carrying out experiments in which yarn temperature is held constant and wind up speed is changed to change the amount of tension on the yarn. A curve for guide pin temperature versus yarn tension is then determined from the experimental data obtained. The slope of the curve gives a value for k3.

The invention will be further illustrated by the following example.

EXAMPLE

Figure 2:
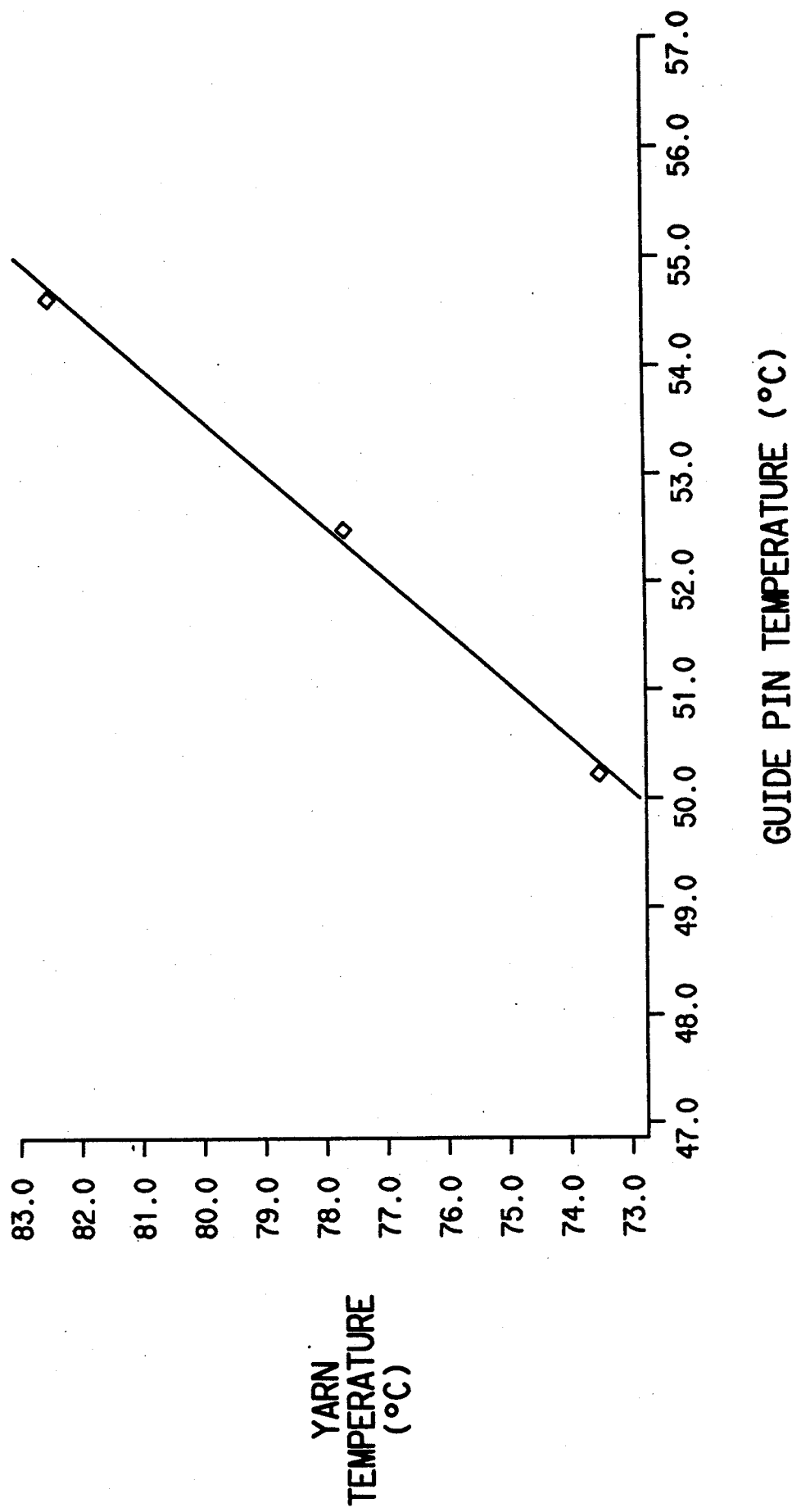
FIG. 2 is a graph of yarn temperature versus guide pin temperature.
Figure 3:
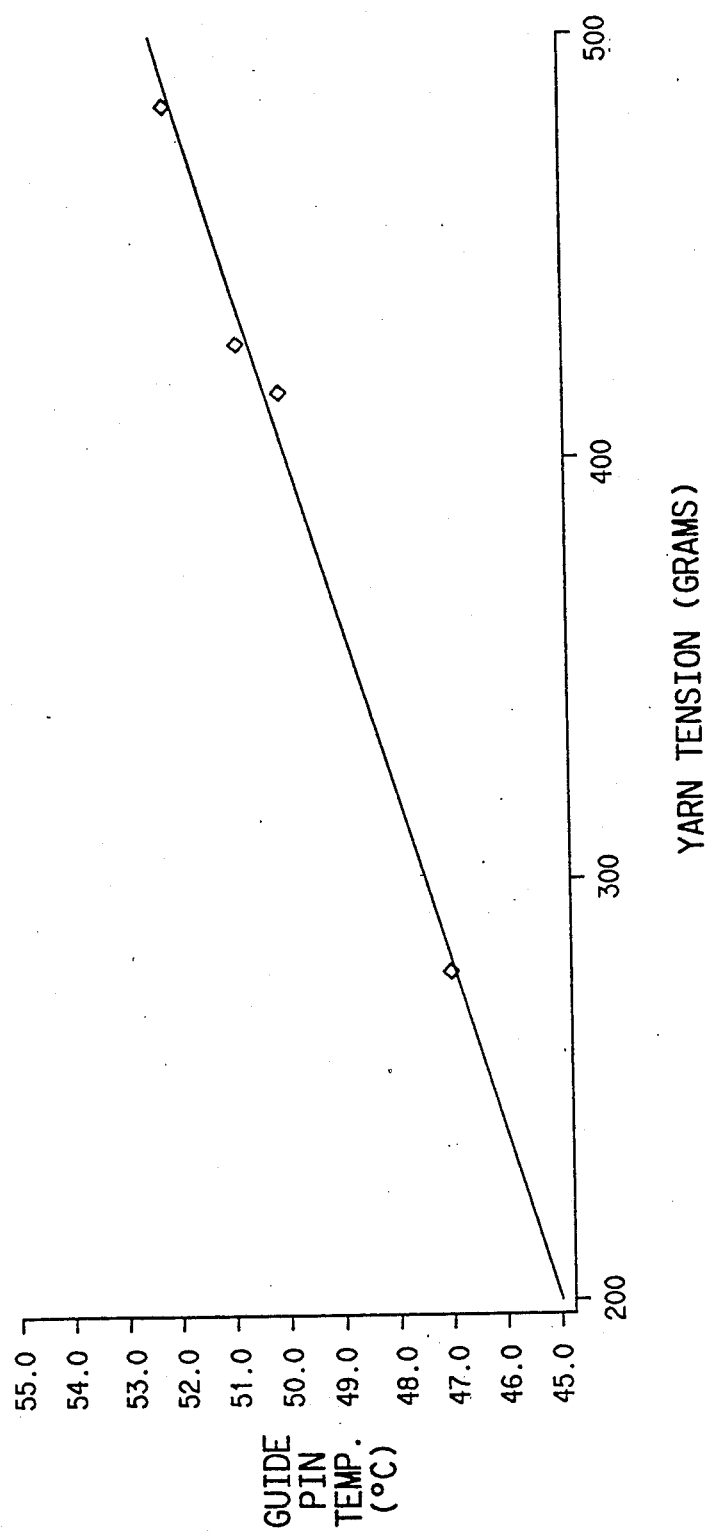
FIG. 3 is a graph of guide pin temperature versus yarn tension.

Experiments were carried out on 1420 dtex bulked nylon 6,6 yarn to determine the constants k1, k2, k3 and k4 by the method described above. FIGS. 2 and 3 show the curves obtained from these experiments. The values of the constants k1, k2, k3, and k4 were determined as follows: a) k4=430 g as the constant yard tension used to obtain FIG. 2 was 430 g, b) k1=−28.3 deg C as it corresponds to the interception point along the guide pin temperature axes and it was found by extrapolating back to the zero axes, and c) k2=2.02 and k3=0.024 as they correspond to the slopes of FIGS. 2 and 3, respectively. The correlation obtained from this experimentation is:

$$Tyarn\ (deg\ C) = -28.3\ (deg\ C) + 2.02 \times [Tpin\ (deg\ C) - 0.024\ (deg\ C) \times (F\ (g) - 430\ (g)0]$$

This correlation may be used to estimate yarn temperature from Tpin measurements obtained from the temperature sensor installed in the pin 20 and from F measurements obtained from the tensiometer 18.

I claim:

1. A method of estimating yarn temperature comprising:
measuring the temperature of a guide pin in contact with said yarn;
measuring the tension of the yarn with a tensiometer; and
estimating yarn temperature using the correlation:

$$Tyarn = k1 + k2 \times [Tpin - k3 \times (F - k4)]$$

wherein Tyarn is the estimated temperature of the yarn;
k1, k2, k3 and k4 are empirically determined constants;
Tpin is the temperature of the guide pin; and
F is yarn tension.

* * * * *